United States Patent [19]
Walworth

[11] Patent Number: 5,213,339
[45] Date of Patent: May 25, 1993

[54] PIPE JOINT GASKET

[75] Inventor: Van T. Walworth, Springville, Ala.

[73] Assignee: Reeves Rubber, Inc., Albertville, Ala.

[21] Appl. No.: 835,284

[22] Filed: Feb. 13, 1992

[51] Int. Cl.$^5$ .......................... F16J 15/10; F16J 15/32
[52] U.S. Cl. .................................... 277/1; 277/207 A; 285/111
[58] Field of Search ....................... 277/227, 1, 207 A; 285/110, 111; 29/235, 237, 450, 451

[56] References Cited

U.S. PATENT DOCUMENTS

| | | | |
|---|---|---|---|
| 2,178,698 | 11/1939 | Penick et al. | 285/110 X |
| 2,230,725 | 2/1941 | Nathan | 277/207 A X |
| 2,252,240 | 8/1941 | Tschappat | 285/110 X |
| 2,505,631 | 4/1950 | Webster | 285/111 X |
| 2,743,899 | 5/1956 | Kinney | 285/111 X |
| 2,815,973 | 12/1957 | Jackson | 285/111 X |
| 2,846,240 | 8/1958 | Beyer | 285/111 X |
| 2,916,306 | 12/1959 | Rickard | 285/110 X |
| 2,953,398 | 9/1960 | Haugen | 277/227 X |
| 2,980,449 | 4/1961 | Dunton | 277/207 A X |
| 2,991,092 | 7/1961 | MacKay | 277/207 A X |
| 3,020,054 | 2/1962 | Driancourt | 277/207 A X |
| 3,315,971 | 4/1967 | Sakurada | 277/207 A |
| 3,390,890 | 7/1968 | Kurtz | 277/207 A X |
| 3,698,744 | 10/1972 | Bevington | 285/111 |
| 3,856,315 | 12/1974 | Stansbury | 285/110 X |
| 4,379,559 | 4/1988 | Bohman . | |
| 4,818,209 | 4/1989 | Petersson et al. | 277/207 A X |
| 4,834,398 | 5/1989 | Guzowski et al. | 285/110 X |

FOREIGN PATENT DOCUMENTS

| | | | |
|---|---|---|---|
| 1118551 | 11/1961 | Fed. Rep. of Germany . | |
| 1129344 | 5/1962 | Fed. Rep. of Germany | 277/207 A |
| 1924410 | 11/1970 | Fed. Rep. of Germany | 277/207 A |
| 481342 | 12/1969 | Switzerland | 285/110 |
| 1033756 | 6/1966 | United Kingdom . | |
| 1133412 | 6/1967 | United Kingdom | 277/207 A |
| 1165663 | 10/1969 | United Kingdom | 285/111 |
| 2071230 | 9/1981 | United Kingdom | 277/207 A |

Primary Examiner—William A. Cuchlinski, Jr.
Assistant Examiner—Scott Cummings
Attorney, Agent, or Firm—Lorusso & Loud

[57] ABSTRACT

A method for assembling a pipe joint including an inner pipe having an outside surface and an outer pipe having an annular groove for receiving a gasket and a pipe joint gasket used in that method. The gasket includes front and back regions, the front region being resilient and relatively rigid, the back region being softer and more resilient than the front region. An interior tip of the back region sealingly engages the inner pipe outside surface and spaces the inner pipe from the front region while the inner pipe is being inserted. The exterior tip of the back region in cooperation with the front and back regions, both secures and seals the front and back regions to the annular groove before inserting the inner pipe. The gasket is displaced by the inserted inner pipe which exerts pressure on both pipes thus sealing the annulus between the pipes. The gasket is further displaced by internal pipe pressure or external pressure which exerts proportionally greater sealing force on both pipes.

15 Claims, 12 Drawing Sheets

PIPE JOINT GASKET

BACKGROUND OF THE INVENTION

1. Field of Invention

The present invention is a pipe joint gasket forming a seal between two cooperating pipes or vessels where one is inserted into the other.

2. Prior Art

Pipe gaskets of similar nature to the present invention are known in the water pipe industry. Pipes of varying materials share a common need to form a seal between two cooperating pipes.

It is known that gaskets with retaining rings have been used to seal cooperating pipes as disclosed in German Patent No. 1,118,551 to Halbach et al., British Patent No. 1,033,756 to Carter and U.S. Pat. No. 4,379,559 to Bohman.

U.S. Pat. No. 2,963,398 and German Patent No. 85/04462 to Nowack teach a gasket device that uses a dual hardness gasket instead of the retaining ring. The advantage of the dual hardness feature is that the gasket is more secure in the outer pipe prior to and during insertion of the inner pipe.

The gaskets disclosed by prior art all have either internal or external contour or both that do not match the surfaces of the pipes that they must seal. For example, Nowack teaches an air gap formed between the exterior contour of the gasket and the inside surface of the outer pipe after the joint is assembled. Others teach similar spaces and gaps, some of which close up during the insertion of the two cooperating pipes. The idea is apparently to make use of a point-load contact area to affect a good seal in a relatively small area at the sacrifice of other areas not establishing effective seals. However, this concept only works in controlled conditions. In practical application, uncontrolled and unfavorable pipe laying conditions are often unavoidable. Muddy trenches and under water installations, for instance, produce opportunities for the entrapment of foreign objects or materials between gasket and the outer pipe prior to the insertion of the inner pipe, and adversely affect the integrity of the seal.

The devices described above present many unrelated problems and various drawbacks. Thus a great need exists for an improved gasket to seal two cooperating pipes or vessels.

SUMMARY OF THE INVENTION

The present invention is a gasket that forms a seal between two pipes or vessels working cooperatively to make a pipe joint. The pipe joint comprises the gasket, an outer pipe with an annular groove to receive the gasket and an inner pipe to be inserted into the outer pipe, where the gasket is forced to fill the space between the two pipes formed by the necessary tolerances for clearance and the annular groove in the outer pipe. The gasket and the two, pipes share one common central longitudinal axis when centered in straight alignment.

The gasket has generally a donut shape and is constructed from elastomeric materials with two distinct regions, a front region that is relatively rigid and less resilient, and a back region that is softer and more resilient. The shape of the gasket of the present invention is defined by exterior and interior contours.

The gasket is set into the outer pipe's annular groove prior to the insertion of the inner pipe. The exterior contour is specifically designed to mostly resemble the curvature of the annular groove in the outer pipe. A portion of the external contour in the resilient back region was designed to have less curvature than the annular groove on the outer pipe, so that when the gasket is set into the outer pipe, this portion is bent and formed to conform to the shape of the annular groove. Due to its resiliency, the conformed portion of the gasket exerts pressure circumferentially on the groove, while the harder front portion forces the gasket radially outward against the pipe. This feature retains the gasket in the annular groove on the outer pipe and resists displacement or removal of the gasket during the insertion of the inner pipe, while at the same time employing an initial seal. Since these gaskets are often installed by pipe manufacturers, gaskets remain secure during shipment. Thus rain, dust and other foreign objects that usually find their way into the pipe joint prior to installations are kept out of pipe joint. The external contour also seals against minor imperfections in the pipe surfaces due to scratches, fins, porosity, coating defects, etc. The internal contour provides similar features providing equal sealing against similar imperfections on the inner pipe.

The internal contour was designed so that the gasket has a smaller inside diameter in the more resilient and soft back region than in the less resilient and rigid front region. This feature keeps the inner pipe centered and prevents the inner pipe from contacting the more rigid front region of the gasket during the insertion process. Since the inner pipe never comes in contact with the rigid region during assembly, less insertion force is required to assemble the pipe joint than similar devices taught by prior art, and the tendency for the gasket to twist or dislodge is reduced making it more secure. The easy insertion and the tendency against migration represent significant improvements over prior art. The tendencies against twisting and dislodging are of great importance when the two cooperating pipes or vessels are not assembled in straight alignment or when they are offset relative to each other.

After the joint is fully assembled, due to its elastomeric properties the gasket has the ability to dynamically respond to internal pipe pressure or external forces acting on the pipes while maintaining a proper seal between the two pipes or vessels. The resiliently conformed external and internal contours of the gasket work cooperatively inversely proportional to the forces acting on the joint to maintain the sealing ability of the gasket.

Accordingly, an object of the present invention is to provide an improved gasket for connecting two cooperating pipes or vessels.

Another object of the present invention is to provide an improved gasket that is more secure than the existing gaskets.

Another object of the present invention is to provide an improved gasket that has a relatively rigid and resilient front region and a more resilient and soft back region.

Another object of the present invention is to provide an improved gasket that has an external contour and an internal contour.

Another object of the present invention is to provide an improved gasket that requires less force to insert the inner pipe into the outer pipe than existing gaskets.

Another object of the present invention is to provide an improved gasket with external contour that has less curvature than the annular groove on the outer pipe so that after the insertion of the gasket, the resilient gasket is forced to conform to the annular grove and in turn exerts pressure on the annular groove keeping the gasket securely within the annular groove.

Another object of the present invention is to provide an improved gasket with internal contour such that after insertion of the inner pipe the resilient gasket is forced to further conform and exerts pressure on the inner pipe keeping it securely in place.

A further object of the present invention is to provide a gasket that seals against imperfections on the surfaces of the inner pipe and outer pipe.

Yet a further object of the present invention is to provide a gasket that works well in adverse pipe laying conditions such as muddy trenches or submerged installations.

Still a further object of the present invention is to provide a gasket that can dynamically respond to internal pipe pressure and external forces acting on the pipes after the pipe joint is assembled while maintaining the integrity of the seal.

Additional objects of the present invention will become apparent to persons skilled in the art in the description of the preferred embodiments.

DESCRIPTION OF THE PREFERRED EMBODIMENT

At the outset, the invention is described in its broadest overall aspects with more detailed descriptions following.

The present invention is a gasket for connecting two cooperating pipes or vessels. The gasket of the present invention, an inner pipe and an outer pipe with an annular groove comprise a pipe joint. The gasket is utilized to seal the open annulus between the inner pipe and the outer pipe, and is able to withstand internal pipe pressure and/or external forces acting on the pipes without losing integrity of the seal.

The gasket has generally a donut shape defining an aperture with distinct exterior and interior contours. The gasket has a resilient and rigid front region affixed to a more resilient and soft back region. Resiliency is the capability of a strained body to recover its size and shape after deformation caused especially by compressive stress (Webster's New Collegiate Dictionary, 1976 edition, Merriam Company, Springfield, Mass.). The gasket is made from elastomeric materials.

The exterior contour is designed to have less curvature than the annular groove at the end of the back region. When inserted into the annular groove, the gasket is bent and forced to conform to the annular groove. The rigid front region then forces the gasket radially outward against the pipe. Due to its resiliency, the conformed exterior surface exerts pressure on the annular groove thus keeping the gasket securely in place, and provides an initial seal against the outer pipe defending against foreign objects being displaced under the gasket prior to assembly.

The interior contour further defines the aperture to have a smaller inside diameter at the soft back region than the inside diameter at the rigid front region. During the insertion process, the inner pipe is centered by the back region, and only makes contact with this conformable soft back region and not the rigid front region thus the insertion process requires less force. The inner pipe displaces the interior contour radially outward into the annular groove, and forces the gasket to further conform. Again, due to its resiliency, the conformed gasket exerts pressure circumferentially around the inner pipe thus seals the annulus between the two pipes.

When internal pressure or external forces act on the pipe joint, the gasket reacts dynamically by absorbing the internal or external load and in turn exerts more pressure on the pipe joint to preserve the integrity of the seal.

Figure 1:
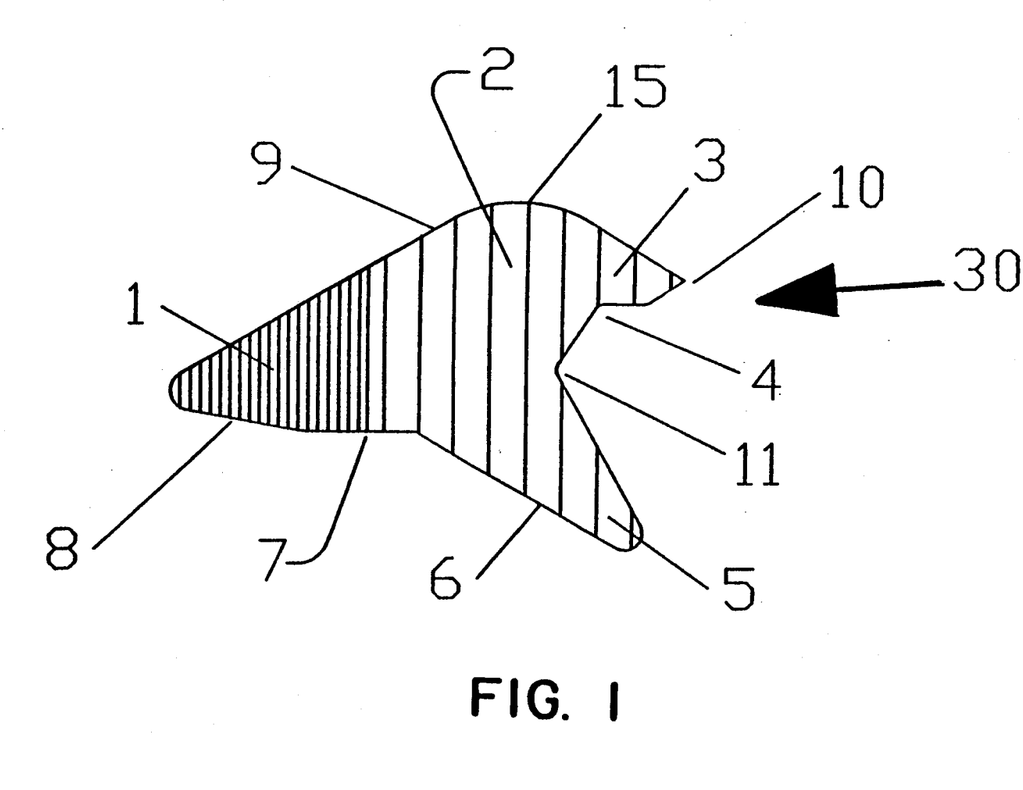
FIG. 1 is a cross-sectional view of a preferred embodiment of the present invention showing the external and internal contours, and the rigid front and the soft back regions of the preferred embodiment.

FIG. 1 shows a cross-sectional view of gasket 30 of the present invention. Gasket 30 comprises rigid front region 1 and soft back region 2. Region 1 is less resilient than region 2. Gasket 30 is further defined by exterior and interior surfaces. The rigid front region 1 comprises tapered nose 8 and surfaces 7 and 9. The soft back region 2 comprises apex 15, exterior tip 3, interior tip 5, and indents 4 and 11.

Figure 2:
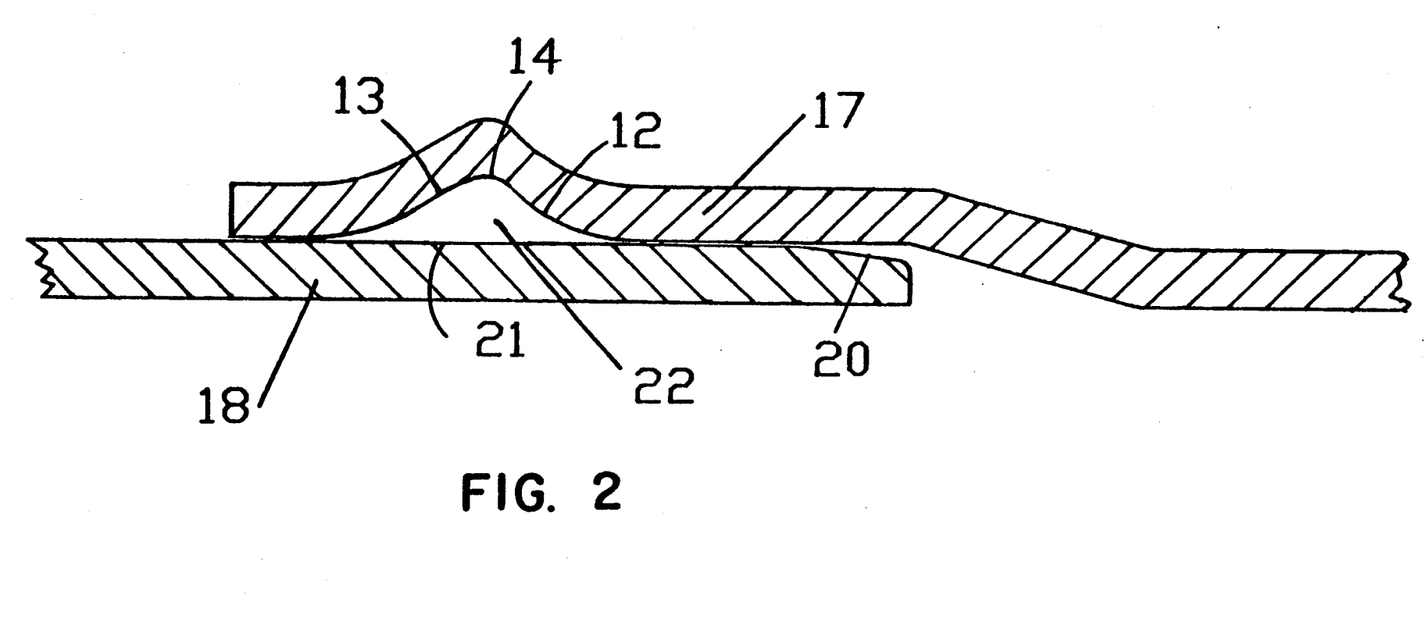
FIG. 2 is a cross-sectional view of a typical pipe assembly comprising an outer pipe with an annular groove to receive the gasket and an inner pipe inserted into the outer pipe.

Gasket 30 of the present invention can be used to seal pipe joints similar to one shown in FIG. 2. Outer pipe 17 has annular groove 22 to receive gasket 30. Groove 22 is defined by surfaces 12 and 13. Surfaces 12 and 13 converge at apex 14 where outer pipe 17 has its largest diameter. Surface 13 has curvature matching surface 9 of front region 1. However, surface 12 has curvature not similar to the back region of gasket 30. Inner pipe 18 has tapered nose 20 and outer surface 21, and has an outside diameter sufficiently small to fit inside outer pipe 17.

Figure 3:
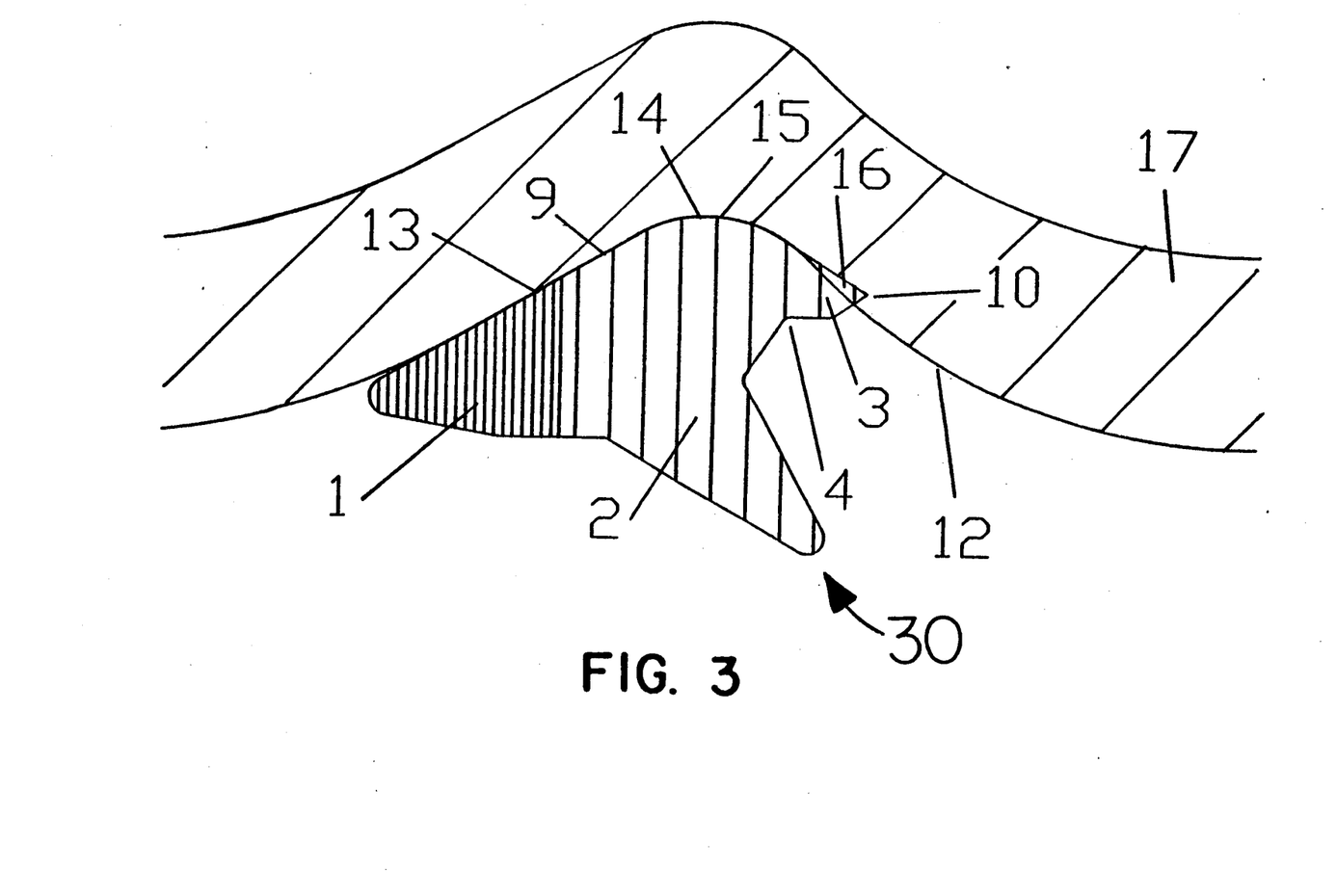
FIG. 3 is a cross-sectional view of a gasket of the present invention superimposed onto the annular groove on the outer pipe showing a portion of the exterior contour having less curvature than the annular groove.

FIG. 3 is a superposition of gasket 30 onto annular groove 22. Exterior tip 3 has less curvature than surface 12 of annular groove 22. Thus in superposition, portion 10 of exterior tip 3 overlaps surface 12.

Figure 4:
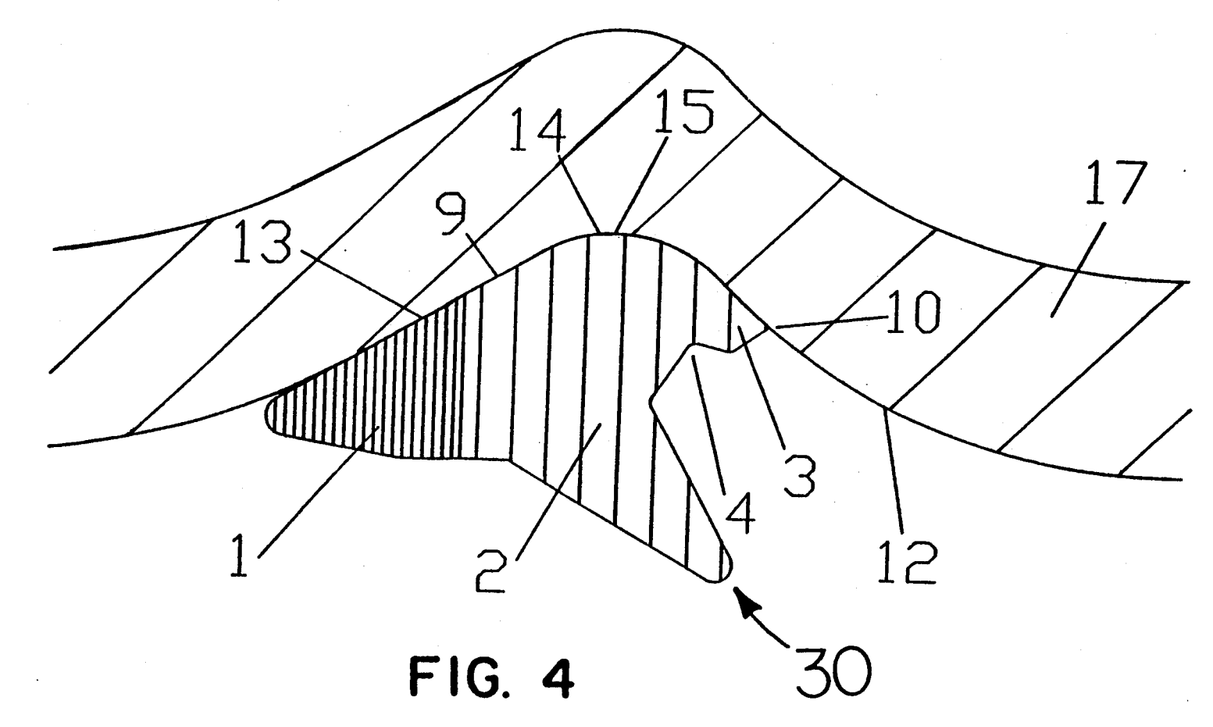
FIG. 4 is a cross-sectional view of a gasket of the present invention inserted in the annular groove showing the external contour in a conformed state.
Figure 9:
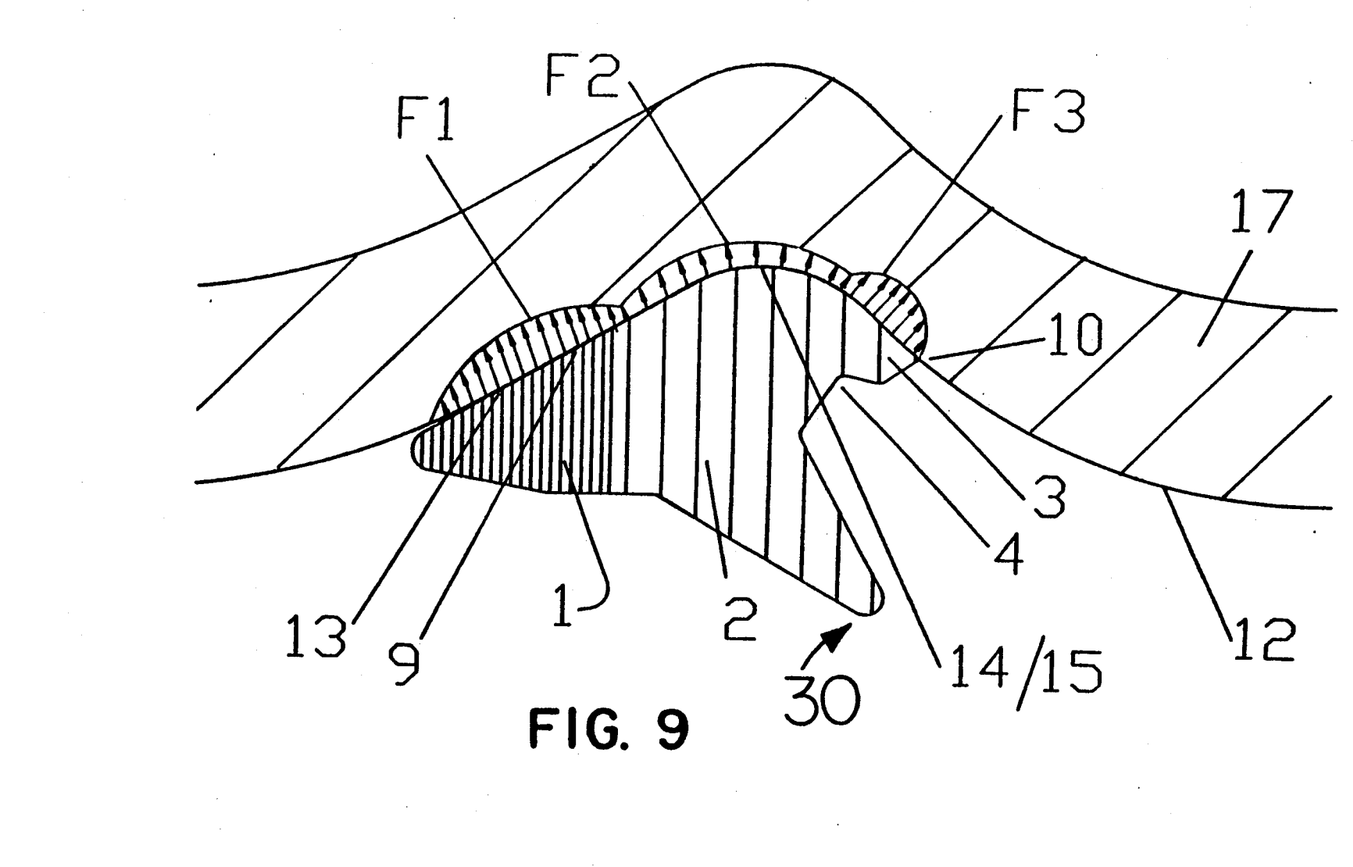
FIG. 9 is a cross-sectional view of a gasket of the present invention inserted in the annular groove showing the distribution of the pressure exerted by the gasket on the annular groove on the outer pipe prior to insertion of the inner pipe.

FIG. 4 shows gasket 30 inserted inside annular groove 22. Surface 9 adjoins surface 13, and apex 15 abuts apex 14. Exterior tip 3 is bent about indent 4 and is forced to fit inside annular groove 22, and portion 10 presses against surface 12. FIG. 9 shows the general pressure profiles: F1, F2 and F3 exerted by gasket 30 circumferentially against annular groove 22. F1 is the pressure exerted by the hard region 1 against annular groove 22. F3 is the pressure exerted by the conformed portion 10 of the soft region 2 against annular groove 22, and F2 is the pressure exerted by the rest of soft region 2 against annular groove 22. Gasket 30 is securely set within annular groove 22, and also seals against any imperfections on the inner surface of groove 22 preventing the inclusion of foreign objects or materials between gasket 30 and groove 22 during adverse pipe laying conditions.

Figure 5:
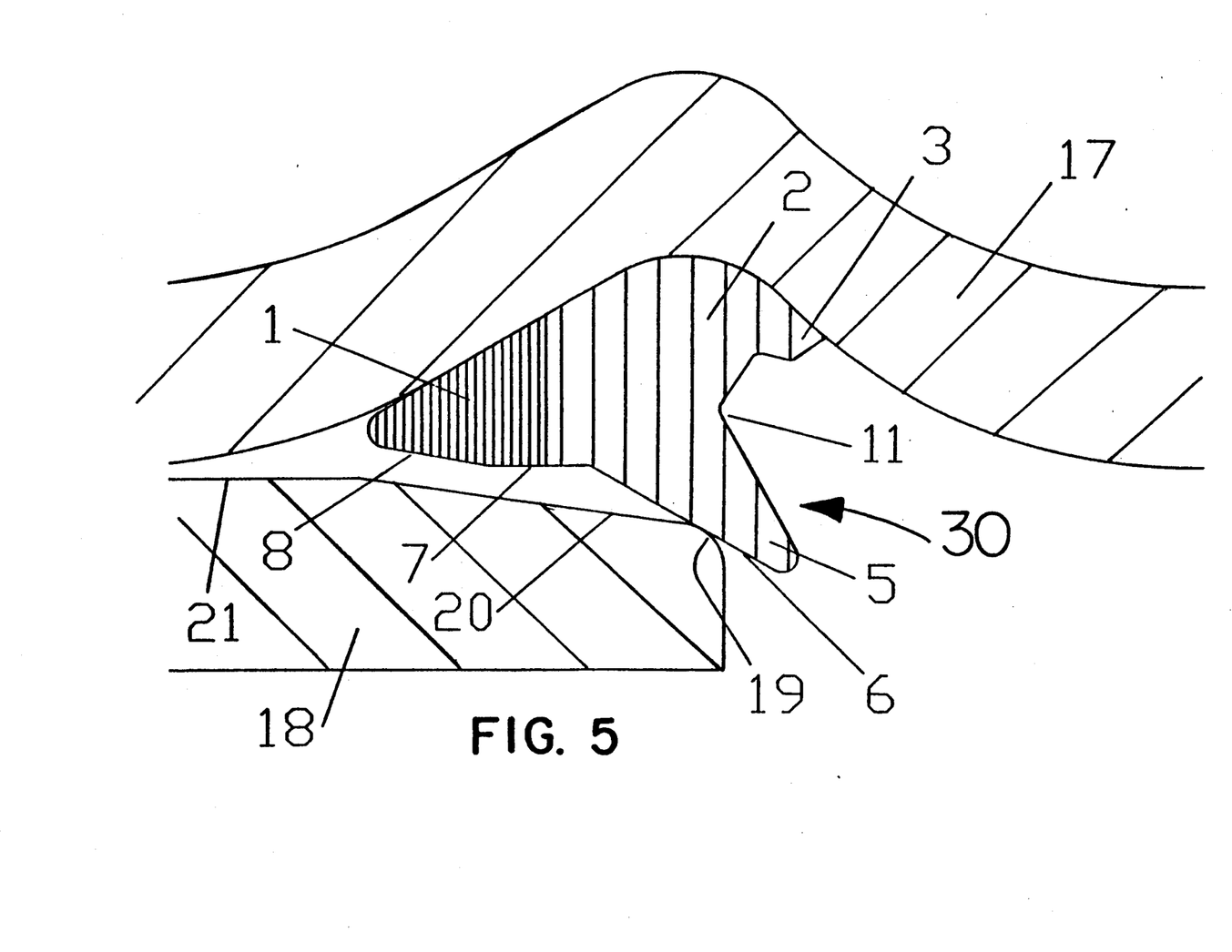
FIG. 5 is a cross-sectional view of a gasket of the present invention inserted in the annular groove and the inner pipe in the insertion process.
Figure 6:
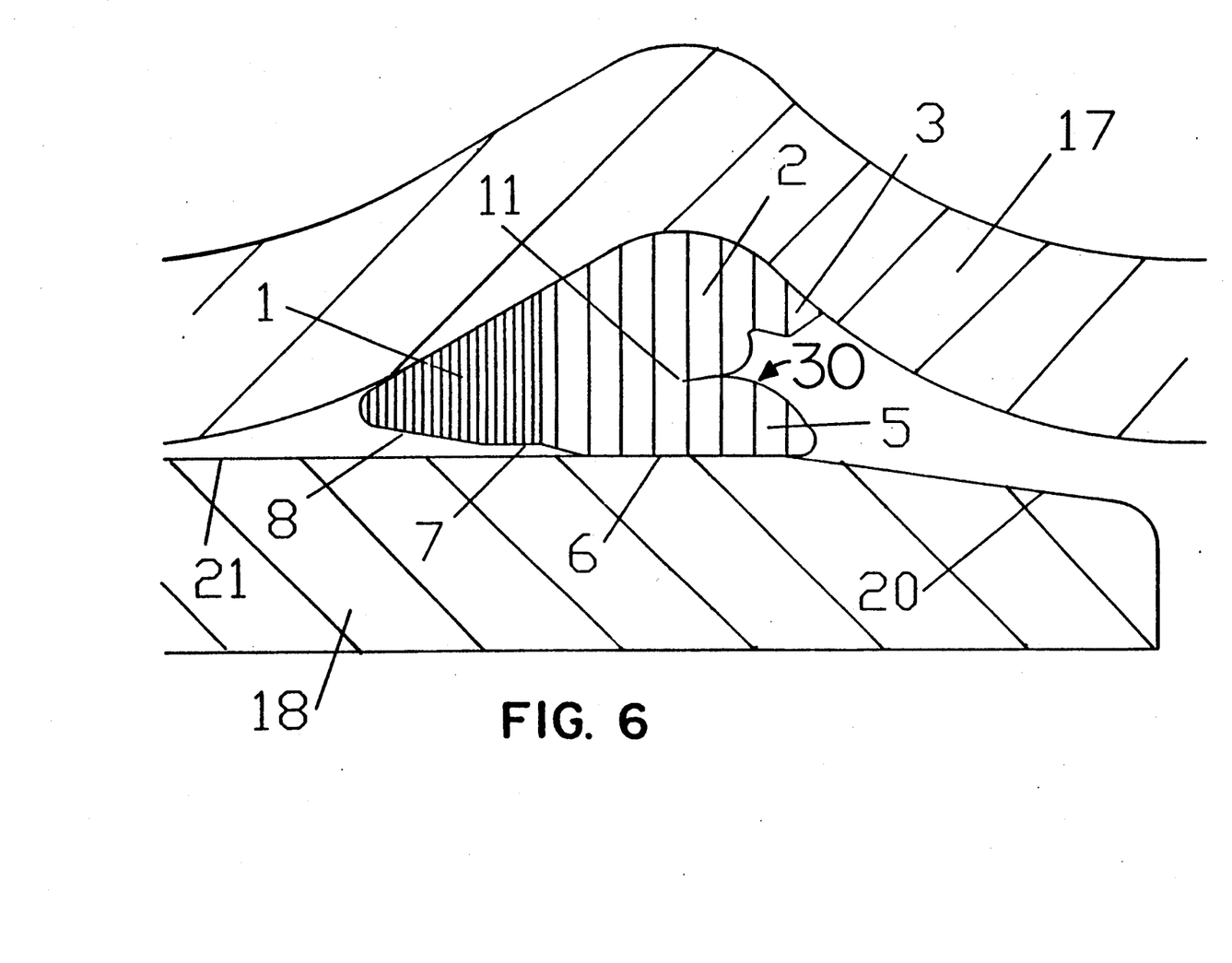
FIG. 6 is a cross-sectional view of a gasket of the present invention in a conformed state and the inner pipe in the inserted configuration.
Figure 10:
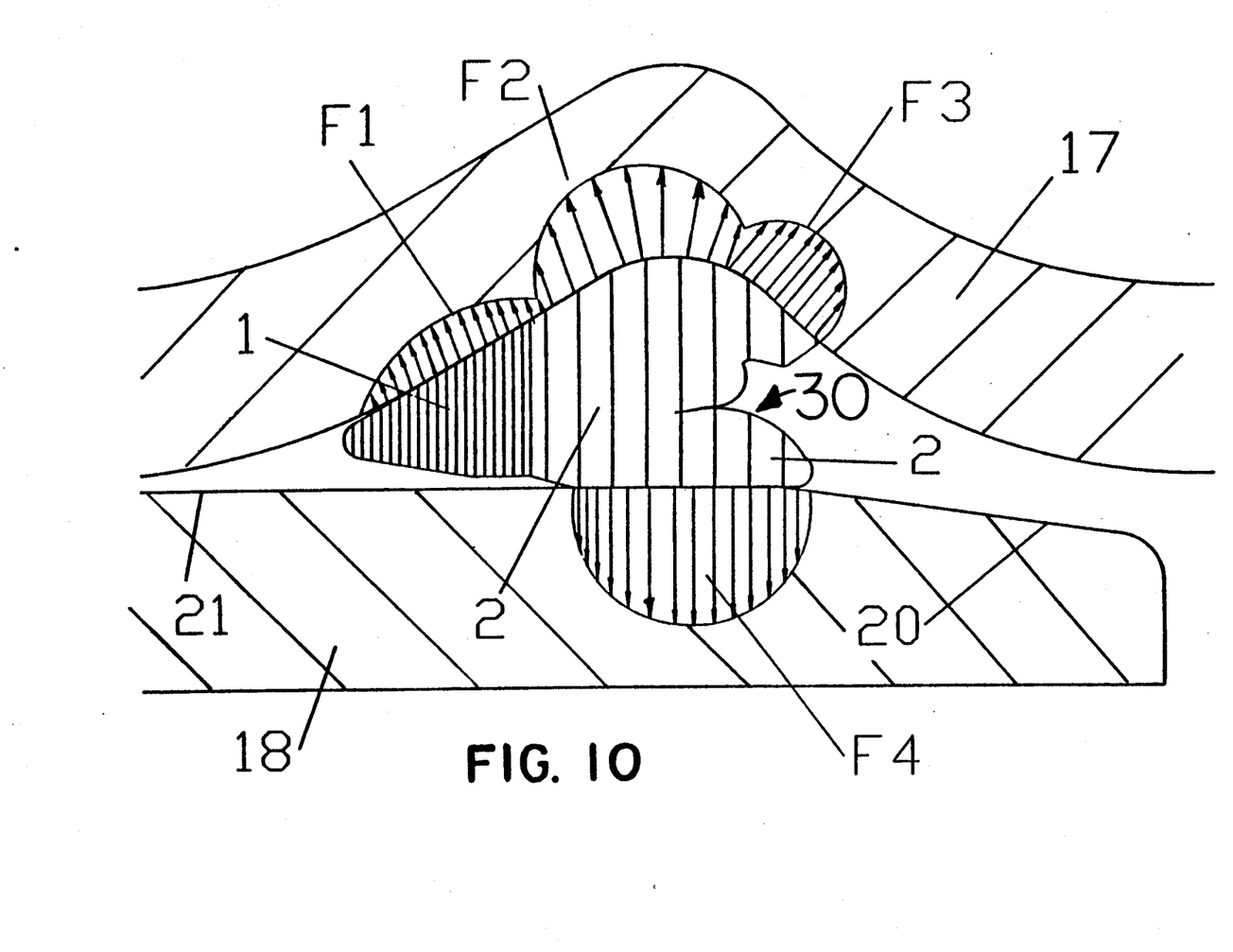
FIG. 10 is a cross-sectional view of the completed pipe joint showing the distribution of the pressure exerted by the gasket on the annular groove on the outer pipe and on the inner pipe.

FIG. 5 shows inner pipe 18 being introduced into the outer pipe 17 and gasket 30 assembly. Tapered nose 20 is making contact with interior tip 5. The aperture (not shown) defined by gasket 30 has the smallest diameter at interior tip 5. Inner pipe 18 is introduced into outer pipe 17 and is received by said aperture. FIG. 6 shows tapered nose 20 of inner pipe 18 pushed pass interior tip 5, and interior tip 5 is bent upward about indent 11. Interior tip 5 now completely abuts outer surface 21 of inner pipe 18 and exerts pressure on inner pipe 18. Gasket 30 also seals any imperfections on the outer surface of inner pipe 18. Note that the hard front region 1 is not contacting inner pipe 18. FIG. 10 shows another general pressure profiles exerted by gasket 30 against annular groove 22 and internal pipe 18 after the insertion of inner pipe 18. The magnitudes F2 and that F3 have increased with inner pipe 18 inserted to balance pressure F4 exerted by interior tip 5 against inner pipe 18. Pressure profile F1 remains unchanged, since hard region 1 was not displaced during the insertion process.

Figure 7:
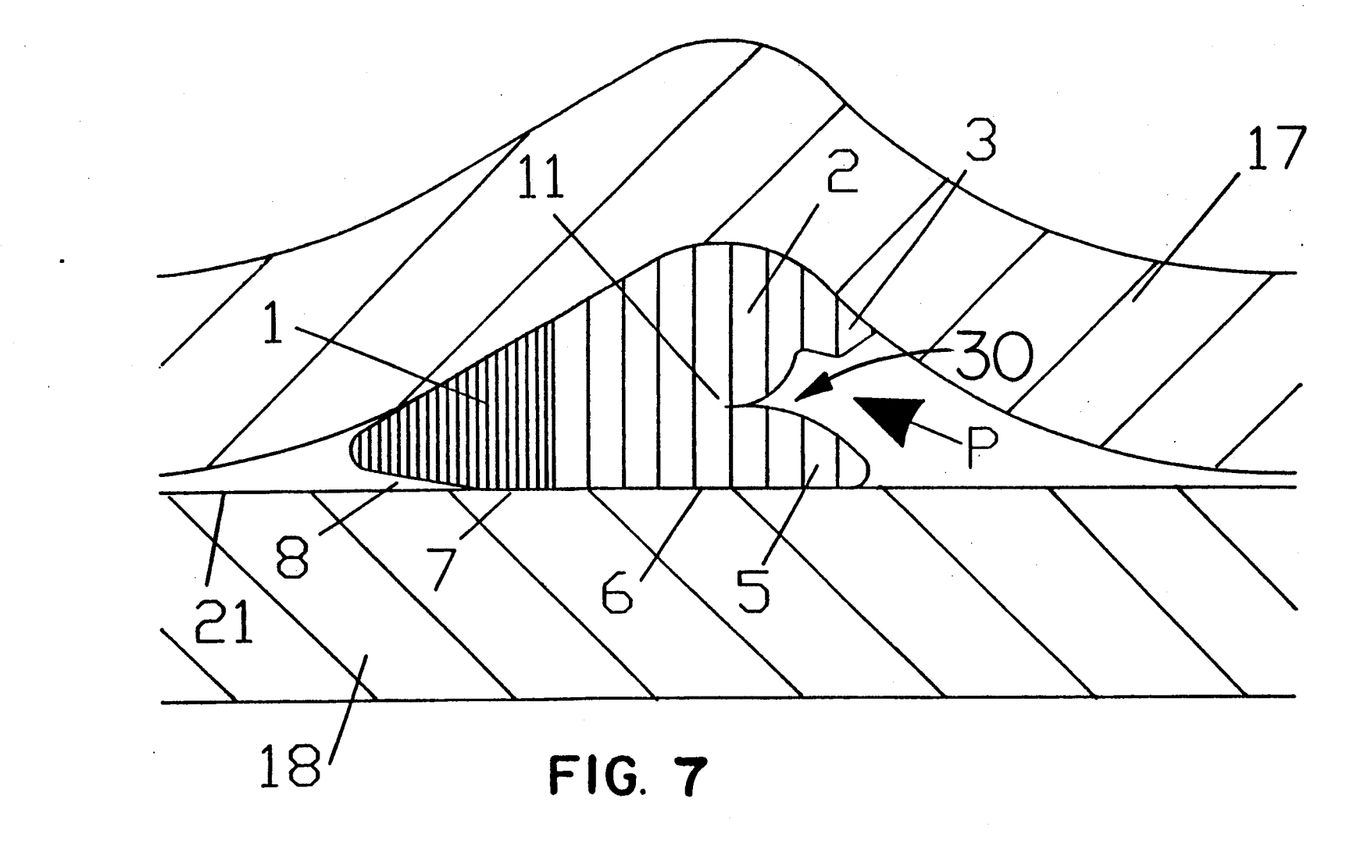
FIG. 7 is a cross-sectional view of a gasket of the present invention, the inner pipe and the outer pipe forming a pipe joint and the internal pressure P acting on the gasket.

FIG. 7 shows internal pressure P acting on the back region 2 of gasket 30. Internal pressure P is present when fluid is transported through the pipe joint. Exterior tip 3 and interior tip 5 reacted dynamically by spreading away from each other to maintain intimate contacts with their respective pipe surfaces as gasket 30 is forced forward wedging hard region 1 between surface 21 of the inner pipe and surface 13 of annular groove 22. The forward movement is limited to the axial displacement of gasket 30 toward a tightly packed wedge at which point surface 7 of hard region 1 is in intimate contact with surface 21 of inner pipe 18 providing a secondary sealing area. If internal pressure P is replaced by an external pressure P' or an internal pressure vacuum (not shown), the secondary sealing area would not developed. Instead, gasket 30 will be forced inward. Exterior tip 3 and interior tip 5 would converge toward each other about indent 11 responding to the axial displacement of gasket 30, and apply more sealing pressures so as to constitute a focused sealing area in the form of converging wedge.

Figure 11:
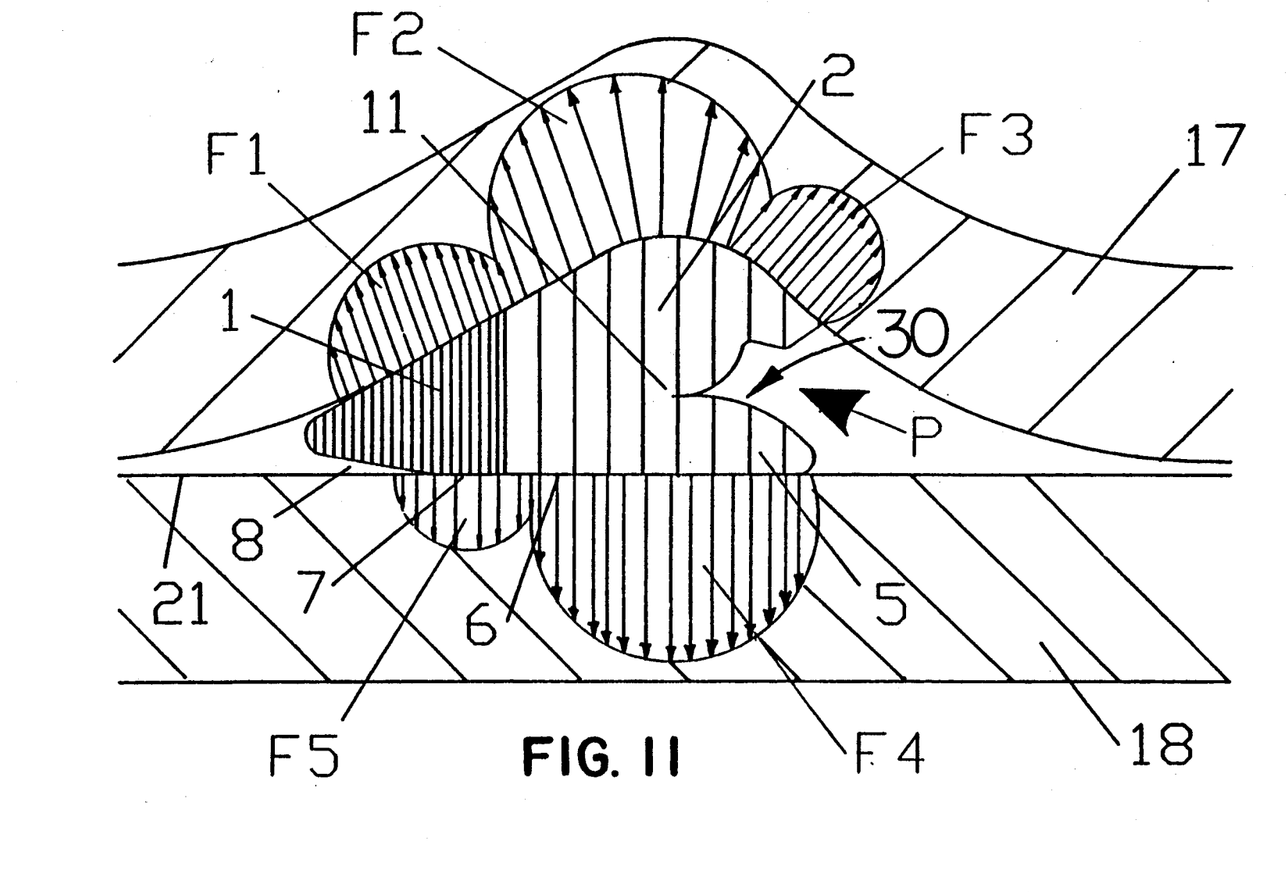
FIG. 11 is a cross-sectional view of the completed pipe joint showing the pressure distribution exerted by the gasket on the annular groove on the outer pipe and on the inner pipe with the presence of internal pressure P.

FIG. 11 shows the pressure profiles exerted by gasket 30 when internal pressure P is present. Surface 7 of the hard region 1 contacts and exerts pressure F5 on the inner pipe 18. F2 and F3 increase in magnitude in response to an increase in magnitude by F4. F1 has also increased in magnitude to respond to the presence of F5.

Figure 8:
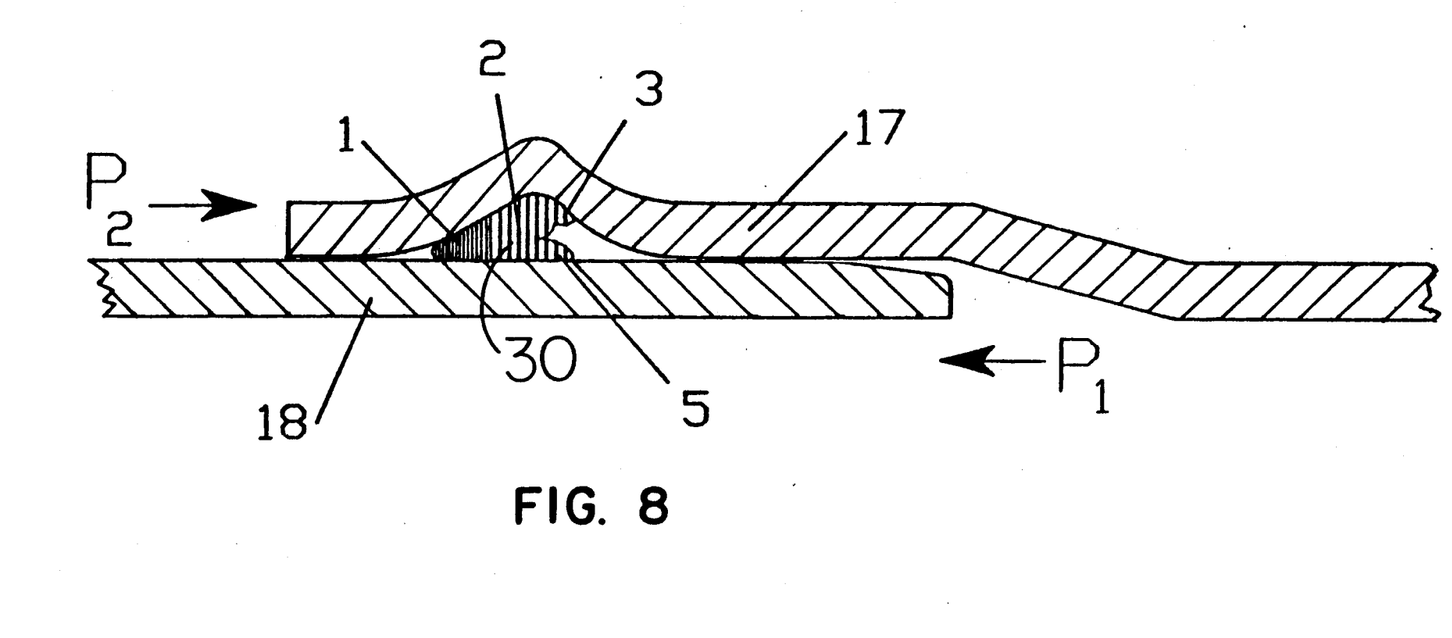
FIG. 8 is a cross-sectional view of the pipe joint with external forces P1 and P2 acting on the pipe joint.

FIG. 8 shows opposite external forces P1 and P2 acting on inner pipe 18 and outer pipe 17 respectively with the tendency to dislodge the pipe joint. Gasket 30 would also react in a manner to counter forces P1 and P2 preserving the seal of the pipe joint. Gasket 30 can also react against other forces acting adversely against the pipe joint such as forces resulting from offset loading conditions, out-of-roundness of the pipes or deflected installations, etc., by responding with dynamic resilience laterally, axially and radially due to its elastomeric characteristics.

Figure 12:
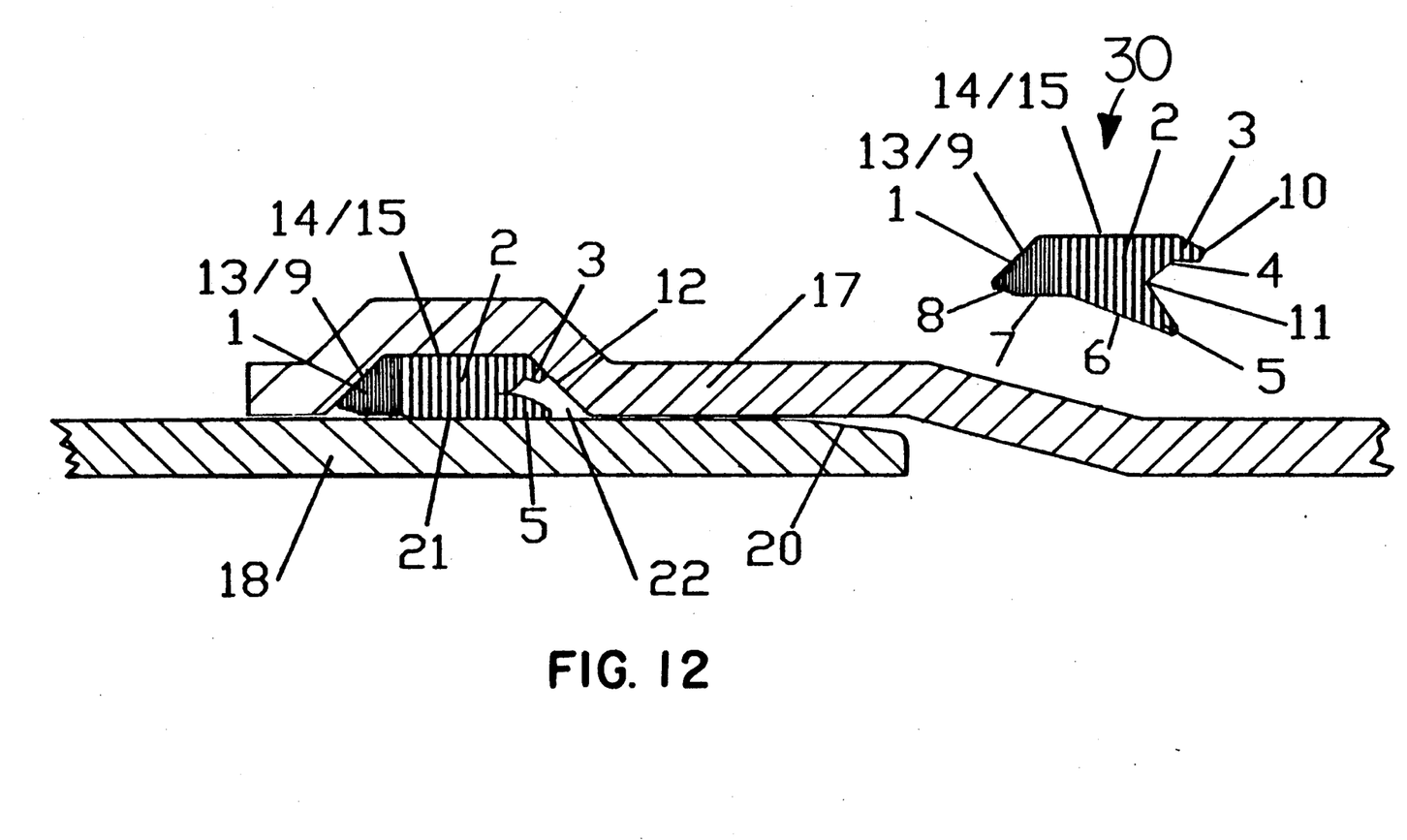
FIG. 12 is a cross-sectional view of one of many other possible embodiments of the present invention.

FIG. 12 shows one of many other embodiments that encompass the features and merits of the present invention. FIG. 12 describes another gasket with different interior and exterior contours to be received by the outer pipe. Other embodiments could include the gasket being carried by the inner pipe with an inwardly projecting groove without forfeiting any of the features and merits of the present invention.

EXAMPLE

Rigid front region 1 needs to be rigid enough to hold the gasket securely in the groove during insertion. Front region 1 can be less rigid if the groove is deep, and inversely more rigid if the groove is shallow. Thus the rigidity of the front region depends in part on the geometry of the groove. Rigid front region 1 of gasket 30 can be constructed out of elastomeric materials having a Shore A durometer of about 75 to 95. Elastomers are commonly known in the art and are widely available commercially.

Soft back region 2 needs to be soft enough to allow easy insertion of the inside pipe into the outer pipe and to allow the interior contour of back region 2 to be easily displaced radially outward into the annular groove on the outer pipe during insertion. Soft back region 2 also needs to be soft enough to seal against imperfections on the pipe surfaces. Soft back region 2 can be constructed out of elastomers having a Shore A durometer of about 40 to 65.

It is understood that the preceding description is given merely by way of illustration and not in limitation of the invention, and that various modifications may be made thereto without departing from the spirit of the invention as claimed.

I claim:

1. A method for assembling a pipe joint wherein the pipe joint includes an inner pipe having an outside surface and an outer pipe having an annular groove for receiving a gasket, comprising the steps of:

providing a gasket, which gasket includes front and back regions, the front region being resilient and relatively rigid, the back region being softer and more resilient than the front region, a joint sealing means for sealingly engaging a portion of the back region with the inner pipe outside surface and for spacing the inner pipe from the front region while inserting the inner pipe, pipe engaging means, which means cooperates with the front and back regions, for both securing and sealing said front and back regions before inserting the inner pipe, wherein the gasket is defined by exterior and interior contours, the exterior contour being proximate the annular groove and the interior contour being proximate the inner pipe outside surface and where the exterior contour closely resembles the shape of the annular groove, but has less curvature than the annular groove in the gasket back region;

bending the gasket;

setting the gasket into the annular groove;

securing and sealing the gasket front and back regions in the annular groove so the gasket exterior surfaces of the front and back regions are placed in intimate contact with the annular groove to prevent foreign materials from being trapped between the gasket exterior surfaces and the annular groove and to prevent dislodgment of the gasket during assembly;

inserting the inner pipe into an aperture defined by the interior contour;

preventing the inner pipe from contacting the front region during insertion;

requiring less force to insert in the inner pipe into the outer pipe; and displacing the gasket in the annular groove during said step of inserting so the back region is displaced radially outward.

2. A pipe joint gasket to seal the open area between an inner pipe having an outside surface inserted into an outer pipe having an annular groove for receiving the gasket, comprising:

a front region being resilient and relatively rigid;

a back region being softer and more resilient than the front region;

wherein said front and back regions each have an exterior surface proximate the annular groove and an interior surface proximate the inner pipe outside surface when the inner pipe is inserted into the outer pipe, the exterior and interior surfaces of said front and back regions defining distinct exterior and interior contours;

wherein the exterior contour closely resembles the shape of the annular groove, but has less curvature than the annular groove in said back region;

pipe engaging means, which means cooperates with said front and back regions, for both securing and sealing said front and back regions to the annular groove before inserting the inner pipe so the exterior surface of the front and back regions are placed in intimate contact with the annular groove and so foreign material is not trapped between the exterior surfaces and the annular groove; and joint sealing means for sealingly engaging a portion of said back region with the inner pipe outside surface and for spacing the inner pipe from said front region while the inner pipe is being inserted into the outer pipe.

3. The gasket of claim 2, wherein said pipe engaging means includes means for bending said back region prior to placing the gasket into the annular groove.

4. The gasket as set forth in claim 3 wherein imperfections on the inner surface of the outer pipe and the outside surface of the inner pipe are isolated and sealed by the gasket.

5. The gasket as set forth in claim 3 wherein the interior contour further defines an aperture having a varying diameter and the smallest diameter being in said back region.

6. The gasket of claim 5, wherein said joint sealing means includes means for receiving the inner pipe in an aperture defined by the interior contour of the back region.

7. The gasket as set forth in claim 6 further including means for displacing said back region radially outward during the insertion of the inner pipe.

8. The gasket of claim 7 further including means, responsive to internal pipe pressure, for both urging a portion of the front region interior surface to sealingly engage the inner pipe outside surface and for increasing sealing forces between the exterior surfaces and the annular groove and between the inner pipe and said joint sealing means.

9. The gasket of claim 8 further including means, responsive to external pressure, for increasing the sealing forces between the exterior surfaces and the annular groove and between the inner pipe and said joint sealing means, wherein pressure is exerted on the inner and outer pipes so as to constitute a sealing area in the form of a converging wedge focused against said back region.

10. The gasket as set forth in claim 9 further comprising means for responding to external forces by exerting additional pressure on the inner and outer pipes proportional to the external forces.

11. The gasket as set forth in claim 2, wherein said front region is sufficiently rigid to keep the gasket within the annular groove.

12. The gasket as set forth in claim 11, wherein the rigidity of said front region is between 75–95 Shore A durometer.

13. The gasket as set forth in claim 12, wherein said back region is sufficiently soft to allow easy insertion of the inner pipe into the outer pipe.

14. The gasket as set forth in claim 13, wherein the rigidity of said back region is between 40–65 Shore A durometer.

15. The gasket as set forth in claim 14, wherein the gasket is constructed from commercially available elastomers or plastics.

* * * * *

UNITED STATES PATENT AND TRADEMARK OFFICE
CERTIFICATE OF CORRECTION

PATENT NO. : 5,213,339
DATED : May 25, 1993
INVENTOR(S) : Van T. Walworth

It is certified that error appears in the above-indentified patent and that said Letters Patent is hereby corrected as shown below:

Col. 1, line 19, delete "2,963,398" and insert --2,953,398--.

Signed and Sealed this

Fifteenth Day of March, 1994

Attest:

BRUCE LEHMAN

Attesting Officer         Commissioner of Patents and Trademarks